United States Patent
Nagase et al.

(10) Patent No.: US 8,085,291 B2
(45) Date of Patent: Dec. 27, 2011

(54) PORTABLE TERMINAL DEVICE

(75) Inventors: Kazuhiro Nagase, Tokyo (JP); Tomohiro Kosaka, Hino (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1456 days.

(21) Appl. No.: 11/590,259

(22) Filed: Oct. 31, 2006

(65) Prior Publication Data
US 2008/0062249 A1    Mar. 13, 2008

(30) Foreign Application Priority Data

Aug. 11, 2006  (JP) ............................... P2006-220368

(51) Int. Cl.
*H04N 7/14*  (2006.01)

(52) U.S. Cl. ................ 348/14.01; 348/14.03; 348/14.08
(58) Field of Classification Search ..... 348/14.01–14.16
See application file for complete search history.

(56) References Cited

U.S. PATENT DOCUMENTS
6,069,648 A * 5/2000 Suso et al. ................. 348/14.02

FOREIGN PATENT DOCUMENTS
JP   2003134484 A * 5/2003
JP   2003258956 A * 9/2003
JP   2006-067436 A   3/2006

* cited by examiner

*Primary Examiner* — Melur Ramakrishnaiah
(74) *Attorney, Agent, or Firm* — Maschoff Gilmore & Israelsen

(57) ABSTRACT

A portable terminal device for communicating other terminal device includes: a display configured to display an image data; a transmitting unit configured to transmit the image data to the other terminal device; a receiving unit configured to receive a reception image data from the other terminal device; a display control unit configured to allow an application image data to be displayed by a predetermined application program to be displayed on the display and either one of the image data and the reception image data; a selecting unit configured to select either one of the image data and the application image data displayed on the display; and a transmission control unit configured to allow the transmitting unit to transmit the image data or the application image data selected by the selecting unit to the other terminal device.

11 Claims, 12 Drawing Sheets

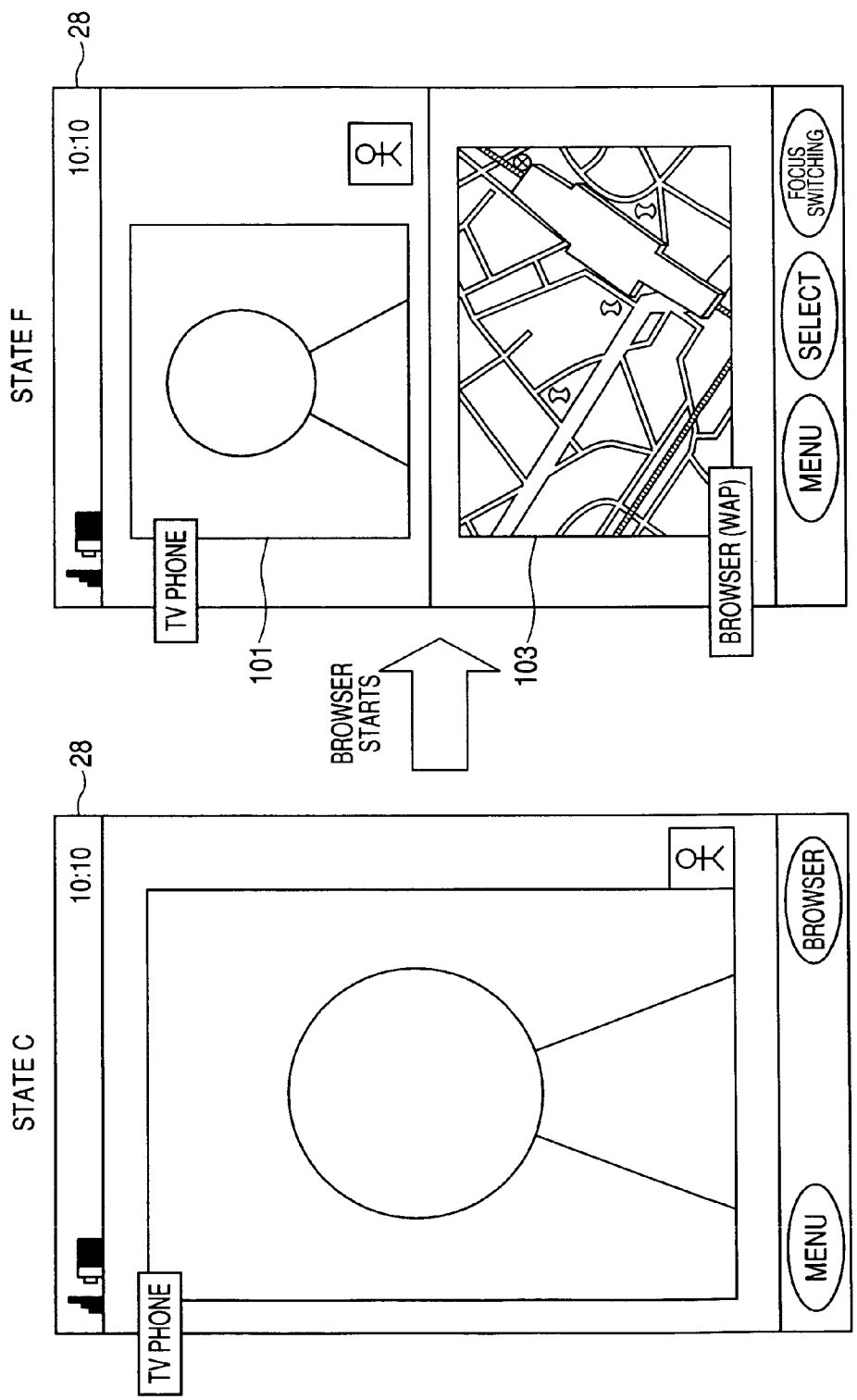

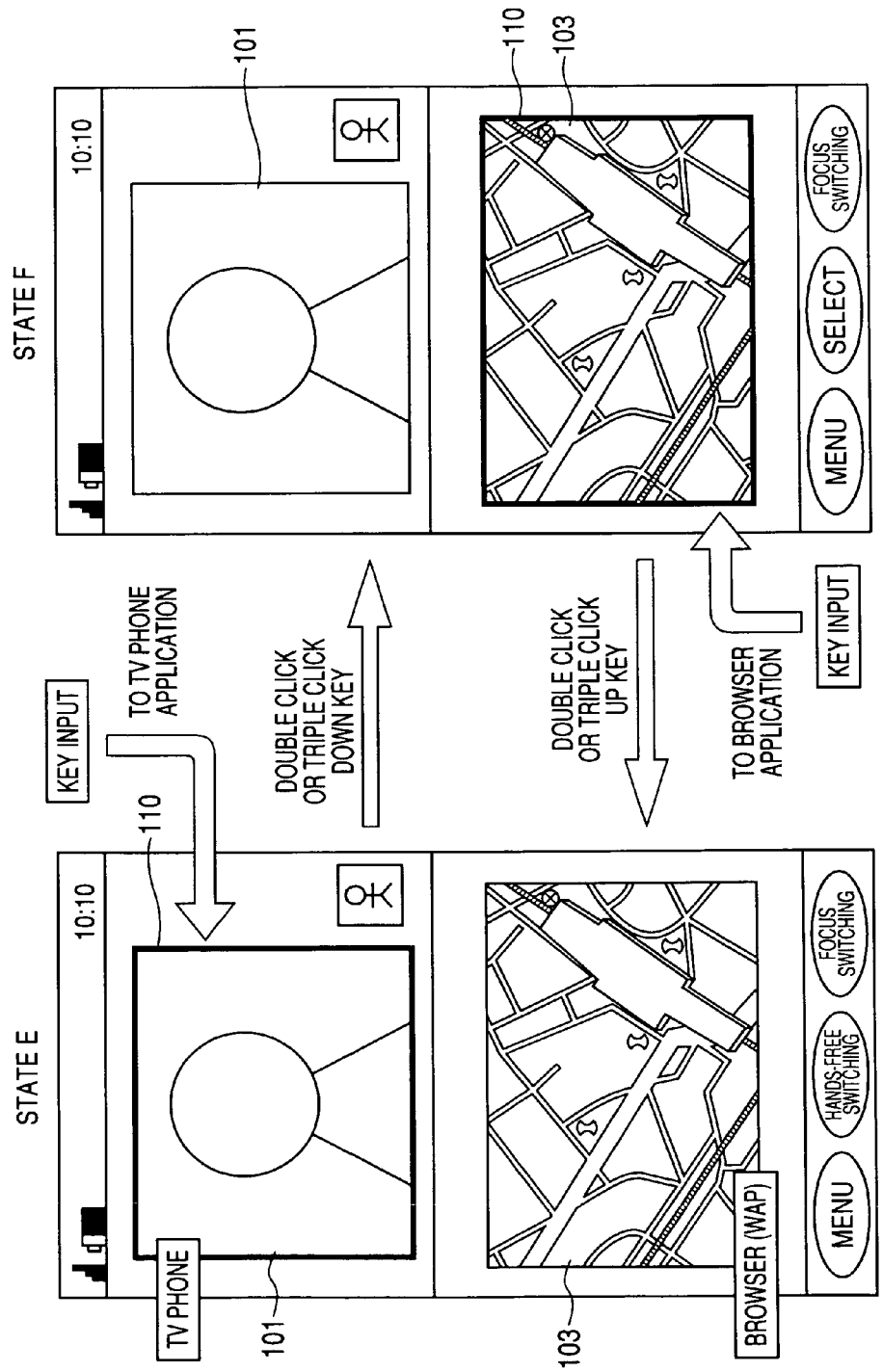

PORTABLE TERMINAL DEVICE

CROSS-REFERENCE TO RELATED APPLICATIONS

This application is based upon and claims the benefit of priority from the prior Japanese Patent Application No. 2006-220368, filed on Aug. 11, 2006; the entire contents of which are incorporated herein by reference.

BACKGROUND

1. Technical Field

The present invention relates to a portable terminal device such as a portable phone, in particular, to a portable terminal device including a function of a videophone.

2. Description of Related Art

In recent years, portable phones having a function of videophone are widely used. A technology regarding the portable phone having such a function of videophone is described in a related art (JP-A-2006-67436).

According to the related art, a communication terminal device that is capable of communicating between speakers while protecting privacy of the speakers when speaking over the videophone is disclosed. According to the above communication terminal device, even when a call is supported by the videophone, when the communication terminal device is set to a "non-transmitting state", a substitute image that is previously set is transmitted to the communication terminal device of the other speaker, instead of the image of the user at the time of speaking.

SUMMARY

According to an aspect of the invention, a portable terminal device for communicating other terminal device includes: a display configured to display an image data; a transmitting unit configured to transmit the image data to the other terminal device; a receiving unit configured to receive a reception image data from the other terminal device; a display control unit configured to allow an application image data to be displayed by a predetermined application program to be displayed on the display and at least one of the image data and the reception image data; a selecting unit configured to select either one of the image data and the application image data displayed on the display; and a transmission control unit configured to allow the transmitting unit to transmit the image data or the application image data selected by the selecting unit to the other terminal device.

According to another aspect of the invention, a portable terminal device for communicating other terminal device, includes: a display configured to display an image data; a transmitting unit configured to transmit the image data to the other terminal device; a receiving unit configured to receive a reception image data from the other terminal device; a display control unit configured to display an application image data to be displayed by a predetermined application program on the display, if a predetermined operation for executing the predetermined application program is operated while the transmitting unit transmitting the image data; and a transmission control unit configured to transmit the application image data, instead of the image data that is transmitted by the transmitting unit, to the other terminal device, in response to the predetermined operation.

BRIEF DESCRIPTION OF THE DRAWINGS

FIG. 10 is an exemplary view showing details of the display states on the display that are states C and F.

FIG. 11 is an exemplary view showing details of the display states on the display that are states E and H.

DESCRIPTION OF THE EMBODIMENTS

As for the type of displays of the portable phones, high resolution LCD is used, according to the progress of display technology. Specifically, displays that are mounted in the portable phones are progressing from QVGA whose pixel numbers are 320×240 dots to VGA whose pixel numbers are 640×480 dots. Therefore, in the future, a portable phone that effectively uses a display having a high resolution will be required.

According to the above-related art, a technology that effectively uses the display having higher resolution is neither described, nor suggested.

According to an aspect of the embodiment, there is provided a portable terminal device that allows a high quality communication by effectively utilizing the display having high resolution.

Hereinafter, a portable phone according to an embodiment of the invention will be described with reference to accompanying drawings.

Figure 1:
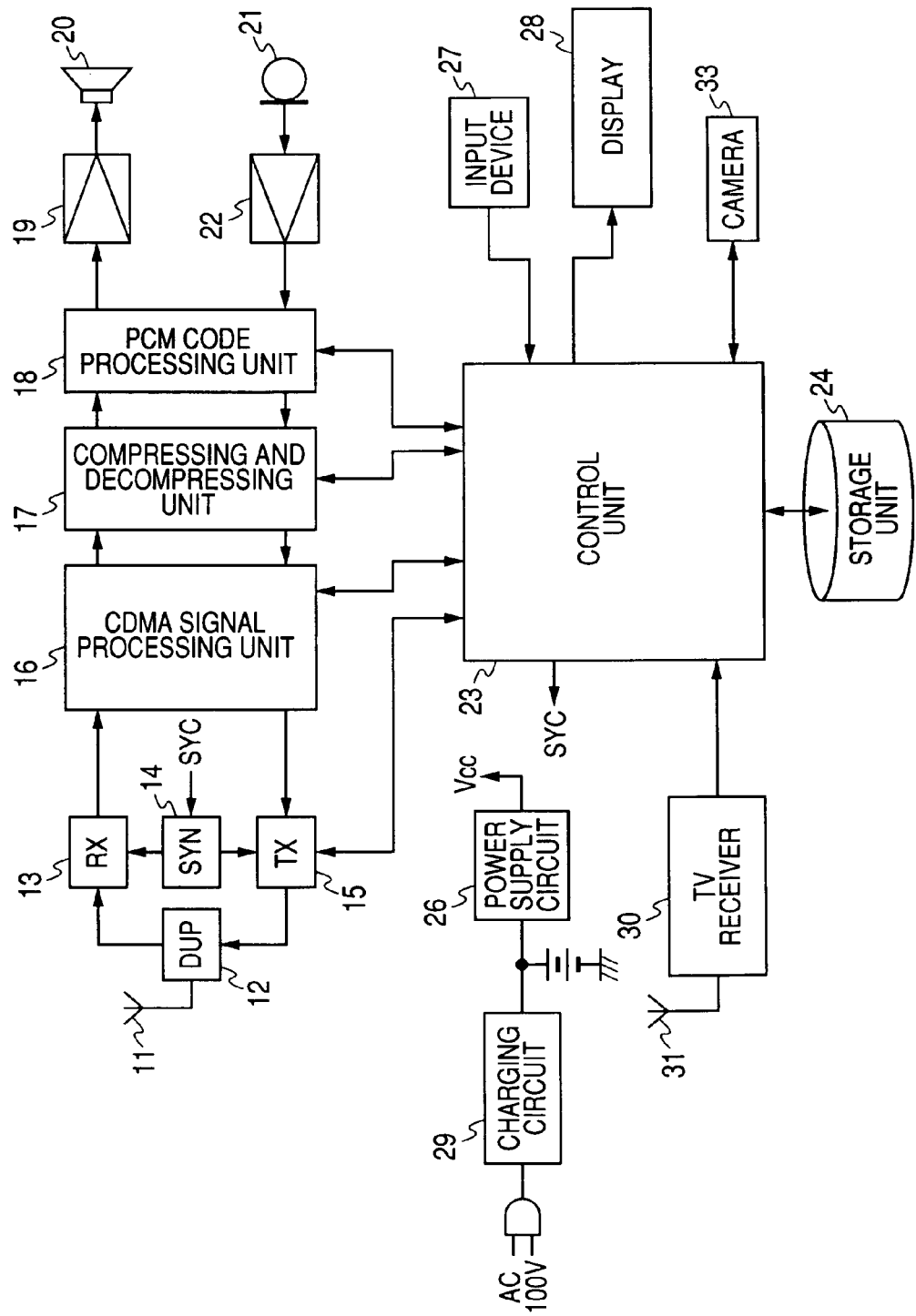
FIG. 1 is an exemplary block diagram showing a configuration of a portable phone according to an embodiment of the invention.

FIG. 1 is a block diagram showing a configuration of a portable phone according to an embodiment of the invention.

In FIG. 1, a wireless signal transmitted from a base station (not shown) is received by an antenna 11, and then input to a receiving circuit RX 13 via an antenna duplexer DUP 12. The receiving circuit 13 mixes the received wireless signal with a local oscillating signal output from a frequency synthesizer SYN 14, to convert (down convert) the frequency into an intermediate frequency signal. Therefore, the down converted intermediate frequency signal is orthogonally demodulated to output a receiving base band signal. Further, the frequency of the local oscillating signal generated from the frequency synthesizer 14 is indicated by a control signal SYC output from the control unit 23.

The receiving base band signal is input to a CDMA signal processing unit 16. The CDMA signal processing unit 16 includes an RAKE receiver. In the RAKE receiver, a plurality of paths included in the receiving base band signal are reversely diffused by a diffusion code. Phases of signals of the paths reversely diffused are adjusted, and then the signals are synthesized. Therefore, reception packet data having a predetermined transmitting format is obtained. The reception packet data is input to a compression/decompression unit 17 (hereinafter, referred to as a compander).

The compander 17 divides the reception packet data output from the CDMA signal processing unit 16 for each type of media by using a multiple dividing unit. The divided data for each type of media is decoded. For example, in a call mode, audio data such as calling voice included in the reception packet data is decoded by speech codec.

Further, even though the portable phone according to the embodiment has a function of a videophone, when video data is included in the reception packet data, the video data is decoded by video codec, such as a videophone.

A digital audio signal obtained by the decoding process is supplied to a PCM code processing unit 18 (hereinafter, referred to as PCM codec). The PCM codec 18 decodes the digital audio signal output from the compander 17 as a PCM signal so as to output an analog audio signal. The analog audio signal is amplified by a reception amplifier 19 and then is output through a speaker 20.

Further, when an audio reproducing mode is set, a control unit 23 reads a corresponding audio content from a storage unit 24, and decodes the audio content to amplify the audio content by the PCM codec 18 and the reception amplifier 19 and then output through the speaker 20.

The digital video signal decoded by the compander 17 is input to the control unit 23. The control unit 23 displays the digital video signal output from the compander 17 on the display 28 via a video RAM. Further, the control unit 23 displays video data captured by a camera 33 which will be described, in addition to the received video data, on the display 28 via the video RAM.

When the reception packet is an electronic mail, the compander 17 supplies the electronic mail to the control unit 23. The control unit 23 stores the electronic mail in the storage unit 24. Therefore, according to the state of the input device 27, the electronic mail is read from the storage unit 24, to be displayed on the display 28.

Meanwhile, in the call mode, an audio signal of a speaker input to a microphone 21 is amplified to a desired level by a reception amplifier 22 and is coded by the PCM codec 18 as a PCM to be a digital audio signal and then input to the compander 17. The video signal which will be output from the camera 33 is converted into a digital signal by the control unit 23 to be input to the compander 17. Further, the electronic mail created in the control unit 23 is also input to the compander 17 from the control unit 23.

The compander 17 detects an amount of energy of the input voice on the basis of the digital audio signal output from the PCM codec 18, and determines a transmitting data rate on the basis of the detected result. The digital audio signal is coded into a format signal corresponding to the transmitting data rate to produce audio data. Further, the digital video signal output from the control unit 23 is coded to produce video data.

The audio data and the video data are converted into packet data according to a predetermined transmitting format in the multiple dividing unit. The transmitting packet data is output to the CDMA signal processing unit 16. When the electronic mail is output from the control unit 23, the electronic mail is multiplexed into the transmitting packet data.

The CDMA signal processing unit 16 performs a spectral diffusion process on the transmitting packet data output from the compander 17, using the diffusion code that are assigned to the transmitting channels. Thereafter, the output signal is output to the transmitting circuit TX 15. The transmitting circuit 15 modulates the signal that is spectrally diffused using a digital modulating method such as a QPSK (Quadrature Phase Shift Keying) method. The modulated signal is synthesized with the local oscillating signal generated from the frequency synthesizer 14 and then frequency-converted into a wireless signal. Then, the wireless signal is amplified to have a high frequency so as to be a transmitting power level that is indicated by the control unit 23. The amplified wireless signal is supplied to the antenna 11 via the antenna duplexer 12, and then transmitted from the antenna 11 to a base station that is not shown.

The portable phone includes a television receiver 30. The television receiver 30 receives a terrestrial television broadcasting signal through an antenna 31, modulates the received television broadcasting signal, and then converts into an image signal and an audio signal. The digital image signal is displayed on a display 28 by the control unit 23. The digital audio signal is supplied from the control unit 23 to the PCM codec 18, converted into an analog audio signal in the PCM codec 18, and then output to the speaker 20 via the reception amplifier 19.

The television receiver 30 further has a function of receiving an FM broadcasting signal, and modulates the received FM broadcasting signal to output a digital audio signal. The digital audio signal is the same as the digital audio signal modulated from the television broadcasting signal. The digital audio signal is supplied from the control unit 23 to the PCM codec 18, and then converted into an analog audio signal in the PCM codec 18 to be output from the speaker 20 via the reception amplifier 19. Further, when an earphone is connected to an earphone terminal (not shown), the audio signal output fro the PCM codec 18 is output to the earphone, instead of the speaker 20.

The power supply circuit 26 generates a predetermined operational power voltage Vcc on the basis of an output from a battery 25 to supply to the individual circuit units. The battery 25 is charged by the charging circuit 29.

The control unit 23 includes a macro computer (CPU: central processing unit), and the operational control that is a feature of the portable phone according to the embodiment is as follows.

The control unit 23 divides the display screen on the display 28 into two parts to simultaneously display a videophone image that is an image displayed due to the videophone function, and an application image that is an image displayed by a predetermined application program on the display 28. Further, the control unit 23 converts a videophone image to be transmitted to a portable terminal device such as another portable phone into the application image on the basis of the operation state of the input device 27 (which will be described in detail with reference to FIGS. 4, 7 and 12).

The camera 33 is a camera for capturing an image. In the portable phone according to the present embodiment, video data serving as a display image for videophone is captured by the camera 33.

Hereinafter, an example of the external appearance of the portable phone according to the embodiment will be described with reference to FIGS. 2 and 3.

Figure 2A:
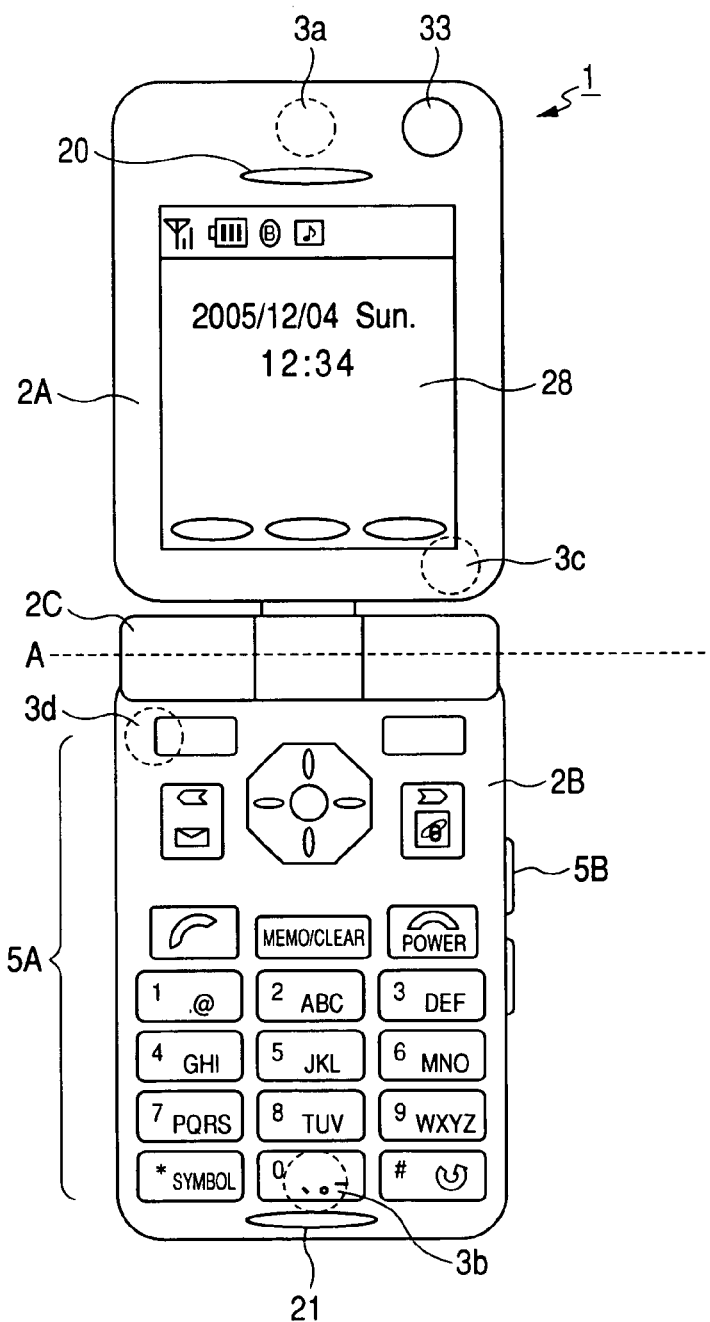
FIG. 2A is an exemplary view showing an external appearance when the portable phone according to the embodiment of the invention is opened at 180 degree.
Figure 2B:
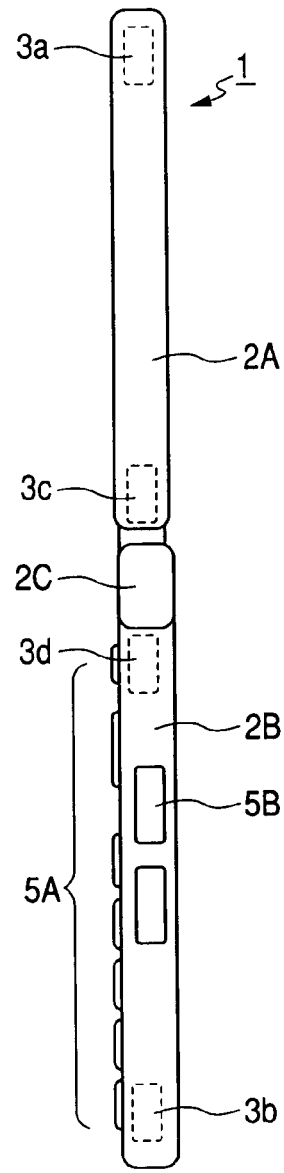
FIG. 2B is an exemplary side view thereof.
Figure 3A:
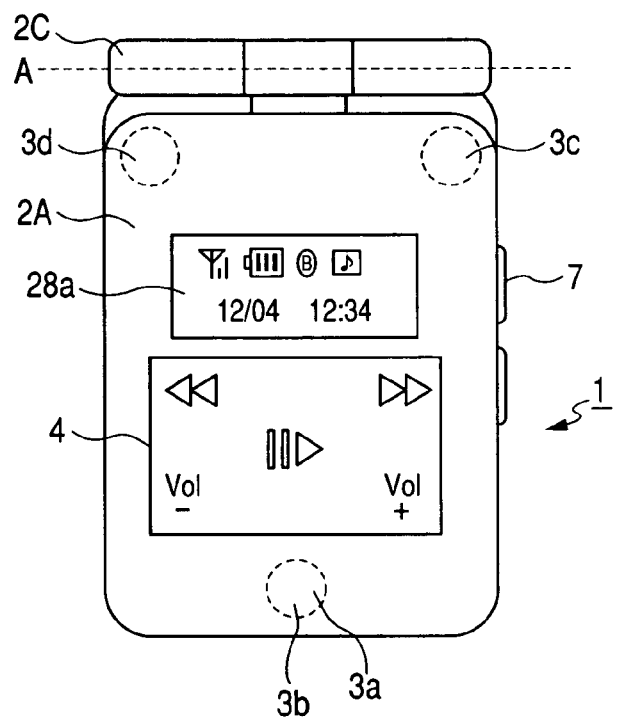
FIG. 3A is an exemplary front view showing an external appearance when the portable phone according to the embodiment is closed.
Figure 3B:
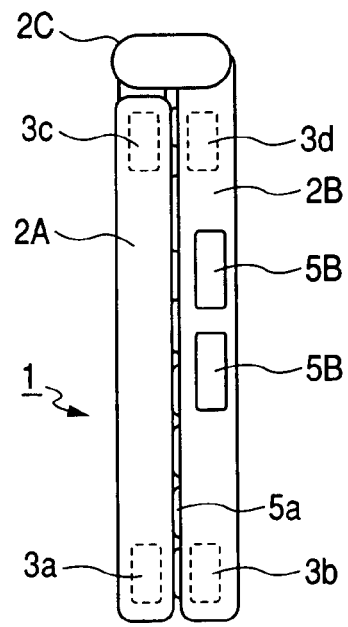
FIG. 3B is an exemplary side view thereof.

FIG. 2 is a view showing an external appearance when the portable phone 1 is opened at 180 degree, in which FIG. 2(A) is a front view, and FIG. 2(B) is a side view. FIG. 3 is a view showing an external appearance when the portable phone 1 is closed, in which FIG. 3(A) is a front view and FIG. 3(B) is a side view. In this case, the portable phone 1 is configured such that an upper housing 2A and a lower housing 2B are connected by a hinge 2C.

The upper housing 2A includes the display 28 formed of LCD, the speaker 20 that serves as a receiver producing the received voice, magnetic sensors 3a and 3b for sensing the state of the portable phone 1, a camera 33, a sub display 28a formed of LCD, and a electrostatic touch pad 4. The sub display 28a and the electrostatic touch pad 4 are provided on the same surface of the upper housing 2A. Further, the speaker 20, the display 28, and the camera 33 are provided on the same surface of the upper housing 2A.

The lower housing 2B includes keys 5A for inputting numbers, characters, and operations of the portable phone 1, etc. side keys 5B, a micro phone 21 for collecting sounds (represented as a transmitter in FIG. 2(A)), and magnetic sensors 3b and 3d for sensing the state of the portable phone 1. Further, the keys 5A and the side keys 5B shown in FIG. 2 correspond to the input device 27 of FIG. 1.

When the magnetic sensors 3a to 3d provided at a predetermined distances on the upper housing 2A and the lower housing 2B are close to each other, detecting signals are output. In this case, among the sensors 3a to 3d, the pair of the magnetic sensor 3a and the magnetic sensor 3b detects whether the upper housing 2A and the lower housing 2B overlap.

Figure 4B:
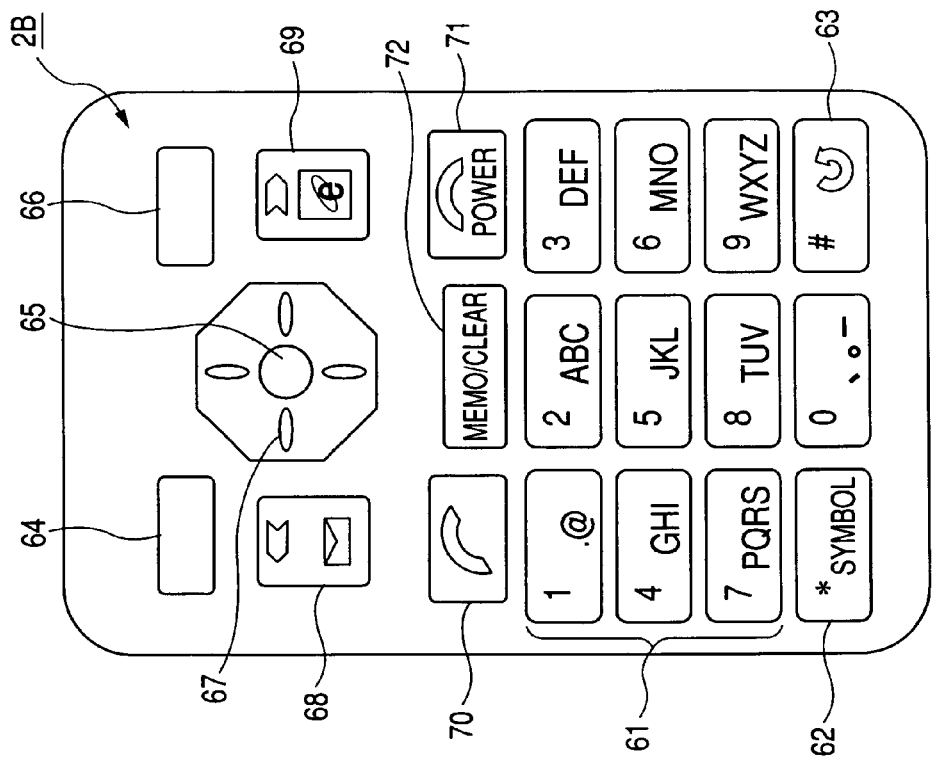
FIG. 4A is an exemplary view showing a display example of a display and FIG. 4B is an exemplary view showing the arrangement example of keys.
Figure 4A:
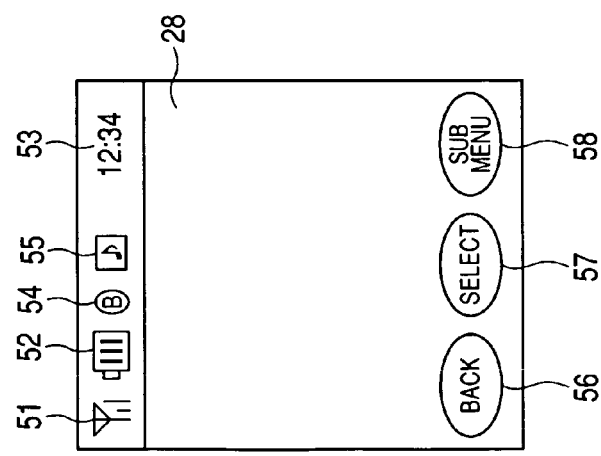

A display example of the display 28 and an arrangement of the keys 5A will be described. FIG. 4(A) shows a display example of the display 28 and FIG. 4(B) shows an arrangement example of the keys 5A.

As shown in FIG. 4(A), on the display 28, an antenna pictograph 51 that represents a level of the current sensitivity of the antenna 11, a battery pictograph 52 that represents the remaining power level of the portable phone 1, a timing display 53 that represents the current time, a BT icon 54 that is displayed while the BT (Bluetooth (registered trade mark)) is performed, and a music icon 55 that is displayed when an MP (music player) is operated are displayed at the uppermost column (hereinafter, upper pictograph column).

The BT icon 54 is displayed such that the background of the icon is blue when the BT is connected (in the drawing, the inner part of the oval is blue), and the background of the icon is white (in the drawing, the inner part of the oval is white) when the server is operated (BT waiting state). Therefore, when the BT is not connected (including the state when BT link is unconnected), the background is not displayed.

The music icon 55 is displayed when the MP is operated, and is also displayed when the MP is reproduced as the background music (hereinafter, referred to as BGM). In the other state, the music icon 55 is turned off. The above operations are controlled by the control unit 23.

In the lowest column of the display 28 (hereinafter, referred to as a lower pictograph column), a brief explanation regarding functions that are performed when a left menu key 64, a confirm key 65 (the center of cross key), and a right menu key 66 are pressed, is displayed as a lower left pictograph 56, a lower center pictograph 57, and a lower right pictograph 58. In this case, the left menu key 64, the confirm key 65 (the center of cross key), and the right menu key 66 correspond to the lower left pictograph 56, the lower center pictograph 57, and the lower right pictograph 58, respectively.

For example, when the display shown in FIG. 4(A) is for the display 28, if the left menu key 64 is pressed, a "return" function is performed. And then, when the confirm key 65 is pressed, even though it is now shown in drawing, the currently focused function is selected. Further, when the right menu key 66 is pressed, a "sub menu" is displayed on the display 28.

As shown in FIG. 4(B), the lower housing 2B includes, as the keys 5A, number keys 61, an '*' key 62, a '#' key 63, a left menu key 64, a confirm key 65, a right menu key 66, a cross key 67, a mail key 68, a browser key 69, a call key 70, a power key 71, and a clear key 72.

The number keys 61 are assigned to Japanese alphabet, symbols, and American alphabet, in addition to the numbers. For example, '1' key is assigned to a number '1', and symbols such as '.', '@'. The '2' key is assigned to a number '2', and American alphabet such as 'A', 'B', 'C', 'a', 'b', 'c'.

The '*' key 62 is assigned with '*'. Further, the '*' key 62 calls up the list of symbols and the list of pictograms in the character input state. The '#' key 63 is assigned with '#'. The '#' key 63 reverses character input toggle by the number keys 61 in the character input state.

The cross key 67 includes an up key, a down direction key, a left key, a right key, and a confirm key 65. That is, the cross key 67 moves a cursor in up, down, left and right directions. Further, the confirm key 65 confirms various functions. The menu key 68, calls up the mail transmitting and receiving function. The browser key 69 is a key for connecting to the Web, etc.

The call key 70 is mainly used when receiving or sending a call. The power key 71 is mainly a key for power on/off, a call-ending key, and a function or an edition ending key. The clear key 72 is mainly a key for canceling the function or the edition, and deleting the input characters. When the display 28 displays a waiting screen, if the clear key 72 is pressed, a message pad is called and then displayed on the display 28.

The control of the operation of the videophone by the control unit 23 of the portable phone according to the embodiment will be described with reference to flow charts of FIGS. 5 and 6. The display state of the display 28 in steps of the flow charts will be described with reference to FIGS. 7 to 12.

Figure 7:
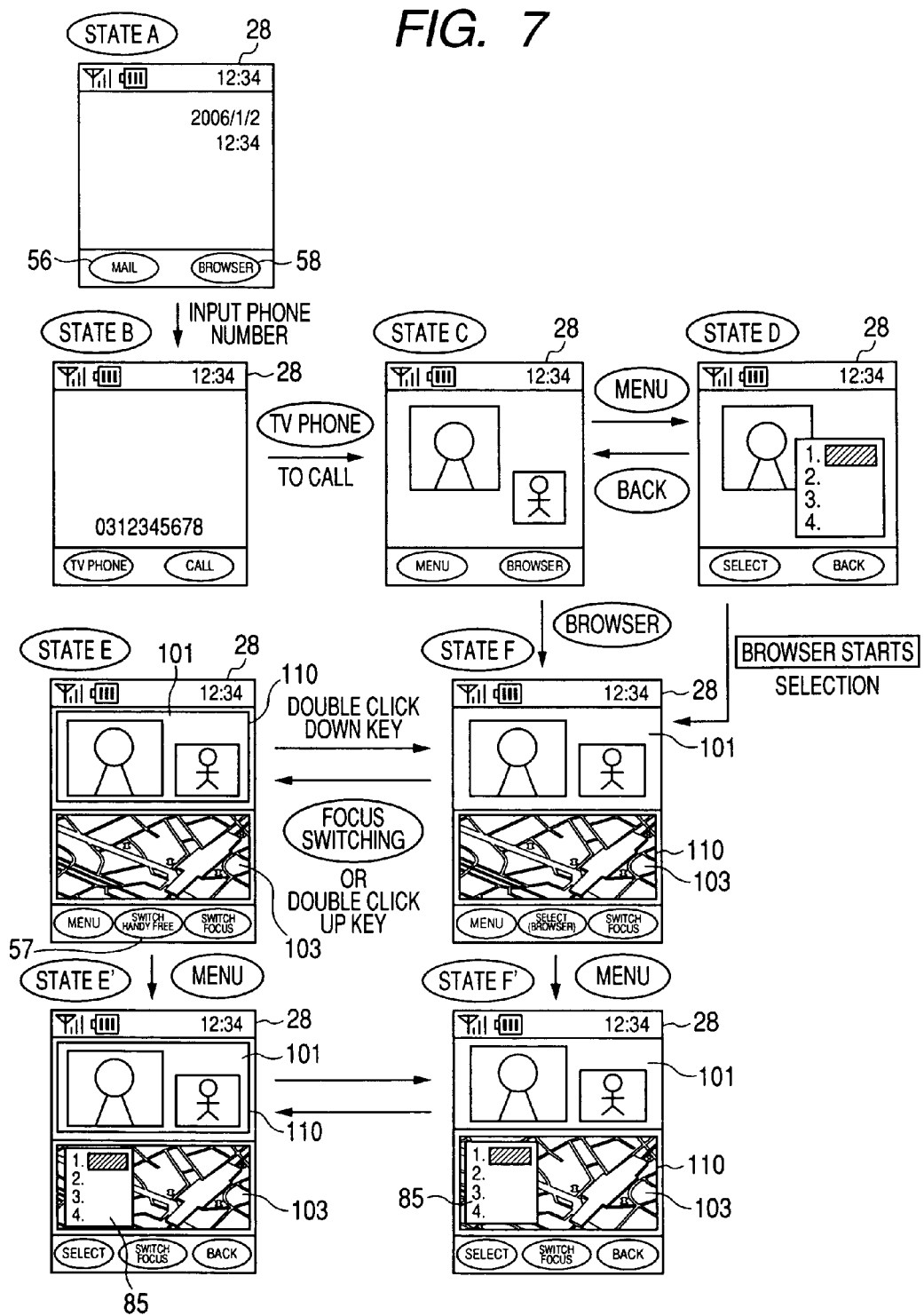
FIG. 7 is an exemplary view showing a first part of display procedure on the display of the portable phone according to the embodiment.

The number keys 61 are manipulated to input a phone number of an intended party, and then it is determined whether the phone number of the intended party is input (the state A of FIG. 7 is shifted to the state B) (step S1). When step S1 is branched to NO, the procedure returns to step S1. That is, step S1 is a step of waiting that the phone number of the intended party is input to the portable phone.

When step S1 is branched to YES, it is determined whether a predetermined operation for calling the videophone is performed (step S2). When step S2 is branched to NO, it is determined whether a predetermined operation for calling a normal phone is performed (step S2A). When step S2A is branched to NO, the procedure returns to step S2. When step S2 is branched to YES, the procedure progresses to a flow chart (not shown) of controlling operation of normal call by the control unit 23. Since the control operation of normal call by the control unit 23 is the same as the operation control used in the conventional portable phone, the flow chart and the description thereof will be omitted.

When step S2 is branched to YES, the videophone is called up (step S3), and then it is determined whether the call is made and the call starts (step S4). When step S4 is branched to NO, the procedure returns to step S4. That is, step S4 is a step of waiting that the call is made and the call starts.

When step S4 is branched to YES, an image that is captured by the camera 33 and then converted into an electrical signal is sent to the portable phone of the intended party (step S5). In this case, an image of a user of the portable phone of the intended party is sent to be displayed on the display 28 (state C in FIG. 7). The image of the user is compressed into an image codec such as H.263 which is used in the normal videophone, and then sent as image information. Further, in the state C shown in FIG. 7, an image transmitted from the party is displayed on a large frame and an image captured by the portable phone is displayed on a small frame. However, this invention is not limited thereto. Thereafter, since the description of the display in the large frame or the small frame is the same as the other state, therefore, the description thereof will be omitted.

Next, it is determined whether the power key 71 is pressed or an operation of completing the call from the portable phone of the intended party is performed (step S6). When step S6 is branched to YES, the call ending process is performed (step S7).

When step S6 is branched to NO, it is determined whether a predetermined operation of running any application other than the videophone is performed (step S8). In this embodiment, WEB browser (hereinafter, simply referred to as browser) is assumed as the application to be running. Here, the browser will be running according to the following method.

In the state C when the call of the videophone is made as shown in FIG. 7, the lower right pictogram 58 is displayed as the 'browser' and is a pictogram for running the browser. Therefore, the user presses the right menu key 66 to run the browser (refer to state F).

In the state C when the call of the videophone is made as shown in FIG. 7, the lower left pictogram 56 is displayed as "menu" and is a pictogram for popping up a predetermined menu screen. Therefore, the user presses the left menu key 64 to display menus including the 'browser running' (refer to state D of FIG. 7). In the state D of FIG. 7, even though the details of all items of the menu are omitted due to the limited space of the drawing, the items of the menu include, for example, 1. transmit a substitute image, 2. run a memo pad, 3. run a browser, 4. run mail, etc. Therefore, the lower right pictograph 56 is a pictograph for performing "selection". When the user manipulates the cross key 67 to move the cursor to "browser running" of the menu and then press the left menu key 64, the browser can be ran (refer to state F).

FIG. 10 is a view showing the state displayed by the display 28 while the browser is running in the videophone, in detail. In this drawing, map information is displayed on the display 28 by the browser.

When step S8 is branched to NO, the procedure returns to step S6. When step S18 is branched to YES, a screen of application (browser) ran in step S8 and a screen of the videophone are displayed on a display screen of the display 28 that is divided into two parts in a longitudinal direction as shown in FIG. 7, and then the procedure proceeds to a sub routine for controlling the operation of two screen display that is a property of the portable phone according to the embodiment (step S9). In this case, the application is not limited to the browser. On the display screen of the application, a mail list, a mail content, or a still image may be displayed. Further, this embodiment is not limited to the two screen display that is divided into two parts in a longitudinal direction, the screen may be divided into two parts in longitudinal and vertical directions to display two screens, and another screen may be displayed in addition to the two screens.

Hereinafter, the sub routine of step S9 will be described with reference to a flow chart shown in FIG. 6. Further, while performing processes in the sub routine, when the power key 71 is pressed or a call ending operation that finishes the call from the intended party is performed, the procedure proceeds to step S7 in the flow chart of FIG. 5 to perform an ending process.

When an application (in this embodiment, browser) is ran by the operation in step S8, as shown in the state F of FIG. 7, between a display screen of videophone displayed on the display 28 (hereinafter, referred to as videophone screen 101) and a display screen of the application (referred to as a browser screen 103), a screen of the application that is ran is active (key input is available) (step S11). Specifically, at the time when the application is ran, the screen of the running application is focused.

Next, between the videophone screen 101 and the browser screen 103 that are displayed on the display 28, it is determined whether an operation of switching the screen to be active is performed (step S12). That is, in step S12, it is determined whether an focus switching operation is performed.

The focus switching operation will be described with reference to FIGS. 7 and 11. Further, FIG. 11 is a view illustrating the states E and F shown in FIG. 7, in detail.

As shown in FIGS. 7 and 11, in the portable phone according to an embodiment, the screen switching (focus switching) that is an active state, that is to say, key input available state is performed by double clicking or triple clicking the up key and the down key of the cross key 67. Therefore, in the portable phone according to the embodiment, a key for focus switching is not needed, which becomes an advantage in a portable phone that has a limited space for providing keys on a housing. However, the operation of switching the screen is not limited thereto, the switching operation is useful for the other operation, and the switching operation may be performed by pressing the key for a long time (pressing for a predetermined time or more). Further, another key may be provided, or keys other than the cross key 67 such as the left menu key 64 or the right menu key 66 may be used to switch the screen.

Specifically, as shown in the state E of FIG. 11, when the videophone screen 101 is active, if the down key of the cross key 67 is double clicked or triple clicked, the browser screen 103 is an active state (state F). Similarly, as shown in the state F of FIG. 11, when the browser screen 103 is active, if the up key of the cross key is double clicked or triple clicked, the videophone screen 101 is an active state (state E).

As shown in FIGS. 7 and 11, when the display screen of the display 28 is divided into two parts, the lower right pictograph 58 indicates "focus switching". Therefore, the focus switching can be performed by pressing the right menu key 66 by the user.

As display for identifying the active state, as shown in FIGS. 7 and 11, the active screen may be surrounded by a solid line 110, or an icon (focus icon) for indicating the active state may be positioned in the active screen.

Further, as shown in FIG. 11, the display of the lower left pictograph 56, the lower center pictograph 57, and the lower right pictograph 58 is switched so as to correspond the active screen whenever the active screen is switched (the focus switching is performed).

In the portable phone according to the embodiment, without providing additional operating member, it is possible to perform focus switching by using an easy operation for a user.

The flow chart of FIG. 6 will be described again. When step S12 is branched to YES, the videophone screen 101 as shown in the state E of FIGS. 7 and 11 is active (step S13). It is determined whether a predetermined operation for displaying a menu is performed (step S14). In this case, as shown in FIGS. 7 and 11, since the lower left pictograph 56 indicates "a menu" in the state E, it is possible to display a sub menu on the display 28 by pressing the left menu key 64 by the user.

When step S14 is branched to NO, between the videophone screen 101 and the browser screen 103 that are displayed on the display 28, it is determined that the focus switching operation is performed (step S15). When step S15 is branched to YES, the procedure proceeds to step S11. When step S15 is branched to NO, the procedure proceeds to step S13.

When step S14 is branched to YES, as shown in the state E' of FIG. 7, the menu 85 corresponding to the videophone is displayed on the display 28 (step S16). In this case, even though the details of the items of the menu 85 are omitted due to the limited space in FIG. 7, examples of items of the menu 85 are "1. screen transmission switch, 2, substituent screen transmit, 3. focus switch, 4. run other application, etc.

In step S16, after the menu 85 is displayed on the display 28, it is determined that the operation of selecting "menu transmission switch" of the menu 85 is performed (step S17). When step S17 is branched to NO, the procedure returns to step S17. That is, step S17 is a step of waiting that the "screen transmission switch" is selected in the menu 85.

Figure 8:
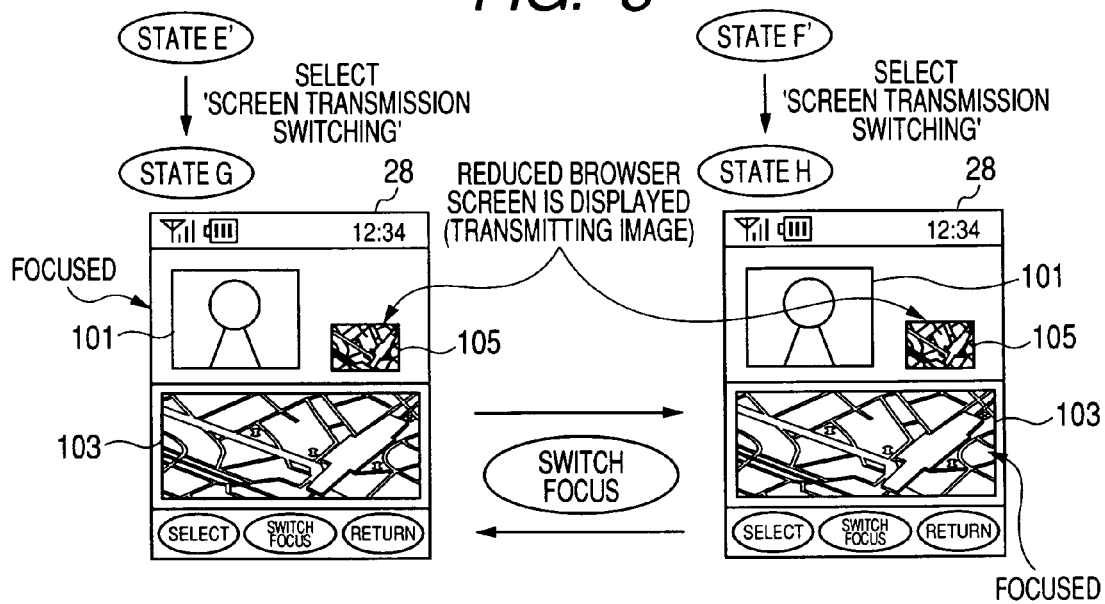
FIG. 8 is an exemplary view showing a second part of display procedure on the display of the portable phone according to the embodiment.

When step S17 is branched to YES, as shown in the state G of FIG. 8, the image that is displayed on the browser screen 103 at the corresponding time is transmitted to the portable phone of the intended party, and the transmitting image is reduced (reduced transmitting image) to be displayed on an adjacent part to the videophone screen 101 (step S18). Thereafter, the procedure proceeds to step S13.

In the portable phone according to this embodiment, the image displayed on the browser screen 103 is not transmitted to the portable phone of the intended party as image information of a still image, but is transmitted as image information that is compressed according to an image codec such as H.263 that is available for the general videophone.

Even though the portable phone of the intended party is not the portable phone according to this embodiment, it is possible to receive the browser screen 103 without any problems. Further, the other party can share in real time the display content of the browser screen 103 that changes from hour to hour corresponding to the operation by a person who transmits the browser screen 103.

In step S18, the reduced transmitting screen 105 displayed on the adjacent part to the videophone screen 101 may not be necessarily displayed. Further, in step S18, an icon indicating that the image is being transmitted to the portable phone of the intended party may be displayed on the browser screen 103.

When step S12 is branched to NO, it is determined that a predetermined operation for displaying the menu is performed (step S19). In here, in the state F shown in FIGS. 7 and 11, since the lower left pictograph 56 indicates the "menu", it is possible to display the menu 85 on the display 28 by pressing the left menu key 64 by the user. When step S19 is branched to NO, the procedure progresses to step S12.

When step S19 is branched to YES, the menu 85 corresponding to running application as shown in the state F' of FIG. 7 is displayed on the display 28 (step S20). In this case, even though the details of items of the menu are omitted due to the limited space of FIG. 7, the items of the menu include, for example, 1. screen transmission switch, 2. book mark, 3. focus switch, 4. run another application, etc.

In step S20, after the menu 85 is displayed on the display 28, it is determined that the operation of selecting "menu transmission switch" of the menu 85 is performed (step S21). When step S21 is branched to NO, the procedure returns to step S21. That is, step S21 is a step of waiting that the "screen transmission switch" is selected in the menu 85.

When step S21 is branched to YES, as shown in the state H of FIG. 8, the image that is displayed on the browser screen 103 at the corresponding time is transmitted to the portable phone of the intended party, and the transmitting image is reduced (reduced transmitting image) to be displayed on an adjacent part to the videophone screen 101 (step S22). Thereafter, the procedure proceeds to step S11.

In step S22, the reduced transmitting screen 105 displayed on the adjacent part to the videophone screen 101 may not be necessarily displayed. Further, in step S22, an icon indicating that the image is being transmitted to the portable phone of the intended party may be displayed on the browser screen 103.

Figure 9A:
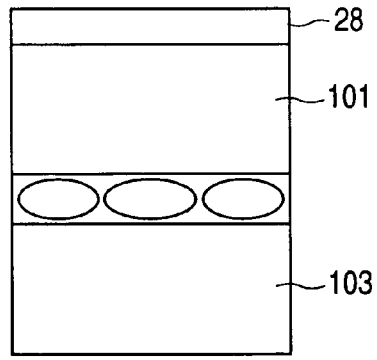
FIGS. 9A, 9B, and 9C are exemplary views showing a first part of display configuration on the display of the portable phone according to the embodiment.
Figure 9B:
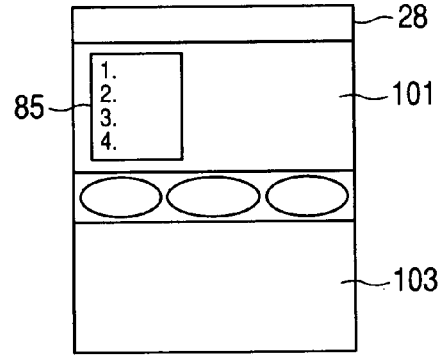
Figure 9C:
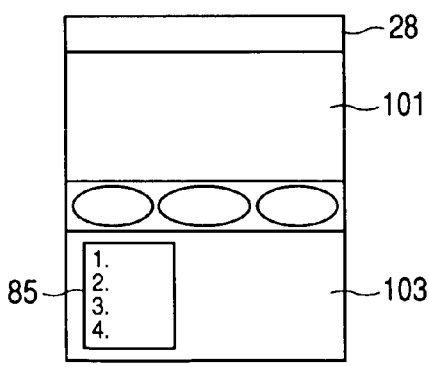

According to this embodiment, as shown in FIG. 9(A), the lower left pictograph 56, the lower center pictograph 57, and the lower right pictograph 58 may be displayed between the videophone screen 101 and the browser screen 103. Further, as shown in FIG. 9(B), the menu 85 may be displayed on the videophone screen 101. Furthermore, as shown in FIG. 9(C), the lower left pictograph 56, the lower center pictograph 57, and the lower right pictograph 58 may be displayed between the videophone screen 101 and the browser screen 103 and the menu 85 may be displayed on the browser screen 103. Otherwise, the menu may be displayed on a screen that is in an active state between the videophone screen 101 and the browser screen 103. The menu 85 may be also displayed on a screen that is not in an active state between the videophone screen 101 and the browser screen 103. However, even when any display mode is selected, the contents displayed on the lower left pictograph 56, the lower center pictograph 57, and the lower right pictograph 58 preferably include at least the content concerning the screen that is in an active state and the content of the menu 85 corresponding thereto preferably includes at least the content concerning the screen that is in an active state. Therefore, by switching the active state, it is possible to change the contents of the lower left pictograph 56, the lower center pictograph 57 and the content of the menu 85.

Hereinafter, referring to FIG. 12, the display screens of the portable phone of the intended party that are in states E to G will be described. Even though a case when the browser screen 103 of the portable phone of a user is in an active state (state F) is assumed for the convenience of description, the case when the videophone screen 101 is in an active state (state E) is the same as the case of the browser screen 103.

Figure 12:
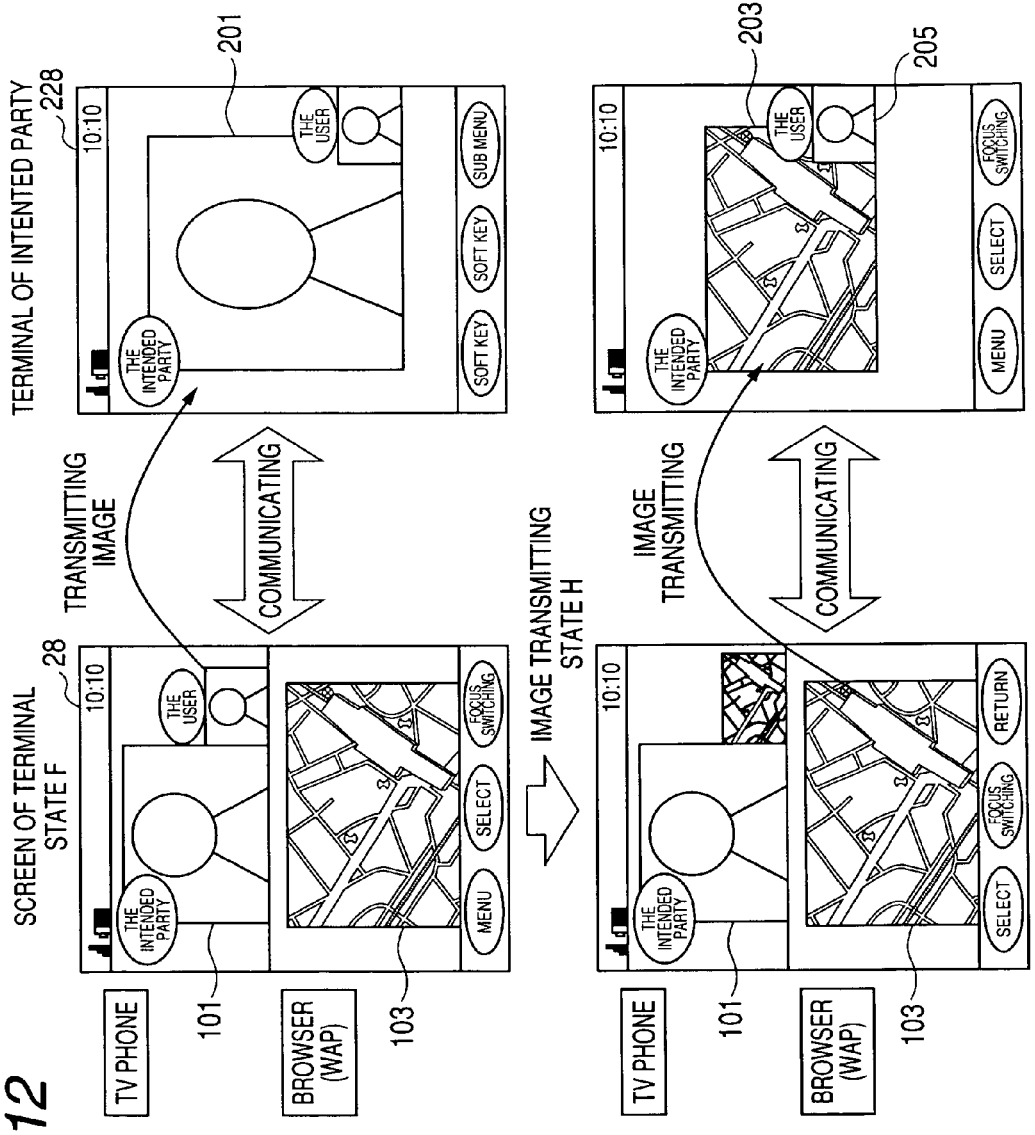
FIG. 12 is an exemplary view showing details of the display states on the display that are states E and H, and the display states on the display of the portable phone of the intended party in the same states.

As shown in FIG. 12, when the portable phone is in a state F, on a display 228 of a portable phone of the intended party, a normal videophone screen 201 is displayed. On the videophone screen 201 of the portable phone of the intended party, an image of the user of the portable phone is displayed as a main image, and an image of the intended party is displayed as a sub image.

Thereafter, when the portable phone enters in a state H via the state F', that is, after the image displayed on the browser screen 103 is transmitted to the portable phone of the intended party, the browser screen 103 of the portable phone is displayed on the display 228 of the portable phone of the intended party as a main image, as shown in FIG. 12 and the image 205 of the intended party is displayed as a sub image.

Specifically, according to the portable phone of this embodiment, it is possible to provide a portable terminal device that is capable of performing high quality communication by using the high resolution display.

More specifically, in the portable phone according to this embodiment, at the time of using the videophone, the screen is divided into two parts by running another application, the videophone screen that is a display screen by the videophone and the browser screen that is a display screen by the application (in this embodiment, WEB browser is assumed) can be simultaneously displayed on the display 28. Further, the browser screen 103 can be transmitted to the portable terminal device of the intended party.

Therefore, when a map is displayed on the display by running the browser at the time using the videophone, and the communication is performed while watching the map, the map can be transferred to the portable phone of the intended party. Therefore, it is possible to share information concerning the map, and further to effectively communicate with the intended party.

Accordingly, according to the embodiment, it is possible to provide the portable phone that is capable of communicating while watching the normal image to the intended party.

Even though this invention is described based on the above embodiment, the invention is not limited to the embodiment, and various modifications and changes can be made within the range of the gist of this invention.

Further, the embodiment includes various steps of the invention, and various inventions can be extracted from an appropriate combination of a plurality of components that are disclosed. For example, even though any component is deleted from all of the components of the embodiment, if the problems described in the section of "problem that the invention is to solve" can be solved, and the effect described in the section of "advantage of the invention" can be obtained, the deleted component can be extracted as the invention.

[FIG. 1]
　16: CDMA SIGNAL PROCESSING UNIT
　17: COMPRESSING AND DECOMPRESSING UNIT
　18: PCM CODE PROCESSING UNIT
　23: CONTROL UNIT
　26: POWER SUPPLY CIRCUIT
　27: INPUT DEVICE
　28: DISPLAY
　29: CHARGING CIRCUIT
　30: TV RECEIVER
　24: STORAGE UNIT
　33: CAMERA

[FIG. 2A]
　a: Sun.
　b: memo/clear
　c: Power
　d: symbol

[FIG. 4(A)]
　56: BACK
　57: SELECT
　58: SUB MENU

[FIG. 4(B)]
　72: MEMO/CLEAR
　71: POWER
　62: SYMBOL

Figure 5:
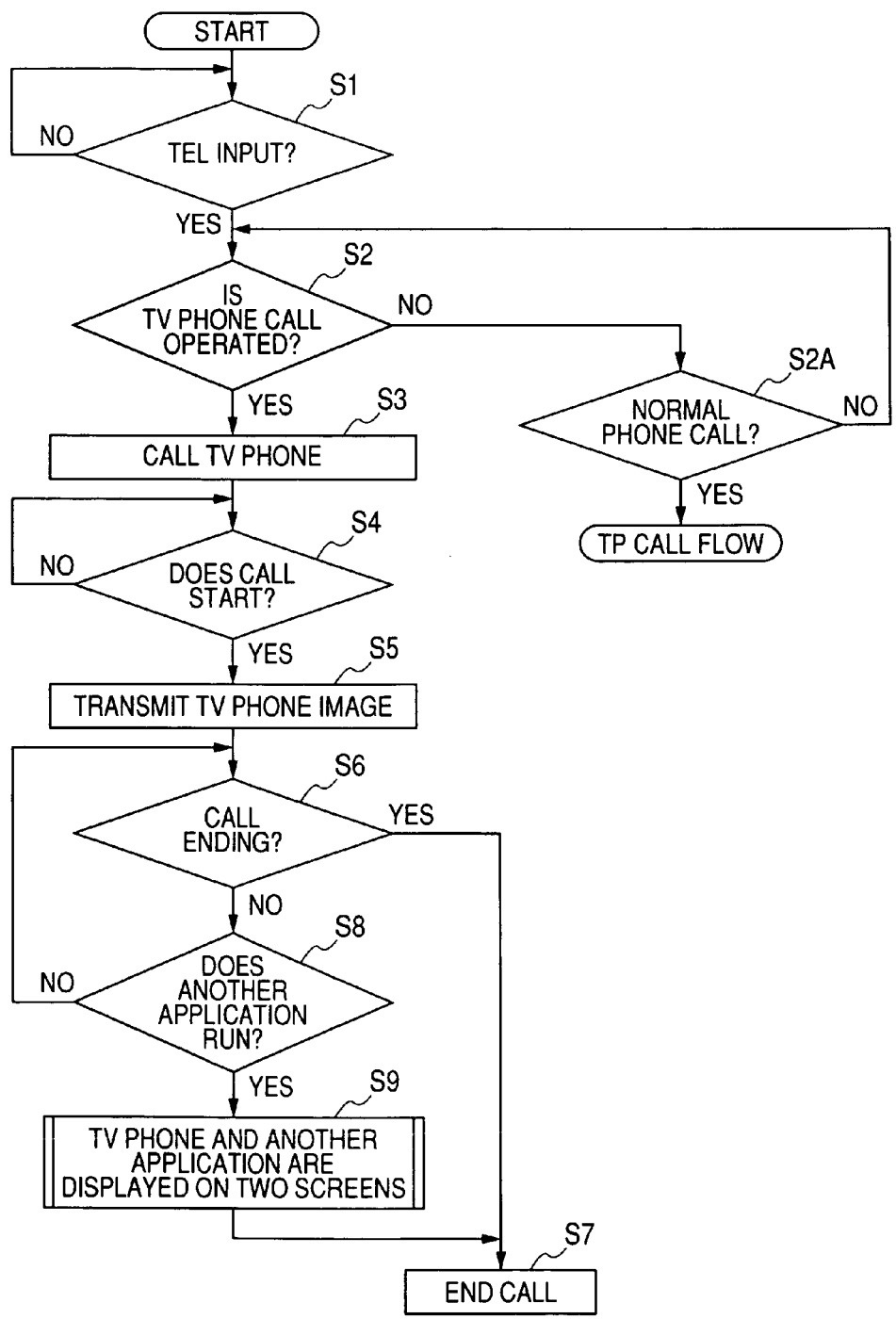
FIG. 5 is an exemplary flow chart showing an operation control by a control unit of the portable phone according to the embodiment of the invention.

[FIG. 5]
　S1: TEL INPUT?
　S2: IS TV PHONE CALL OPERATED?
　S3: CALL TV PHONE
　S4: DOES CALL START?
　S5: TRANSMIT TV PHONE IMAGE
　S6: CALL ENDING?
　S8: DOES ANOTHER APPLICATION RUN?
　S9: TV PHONE AND ANOTHER APPLICATION ARE DISPLAYED ON TWO SCREENS
　S7: END CALL
　S2A: NORMAL PHONE CALL?
　TP CALL FLOW

Figure 6:
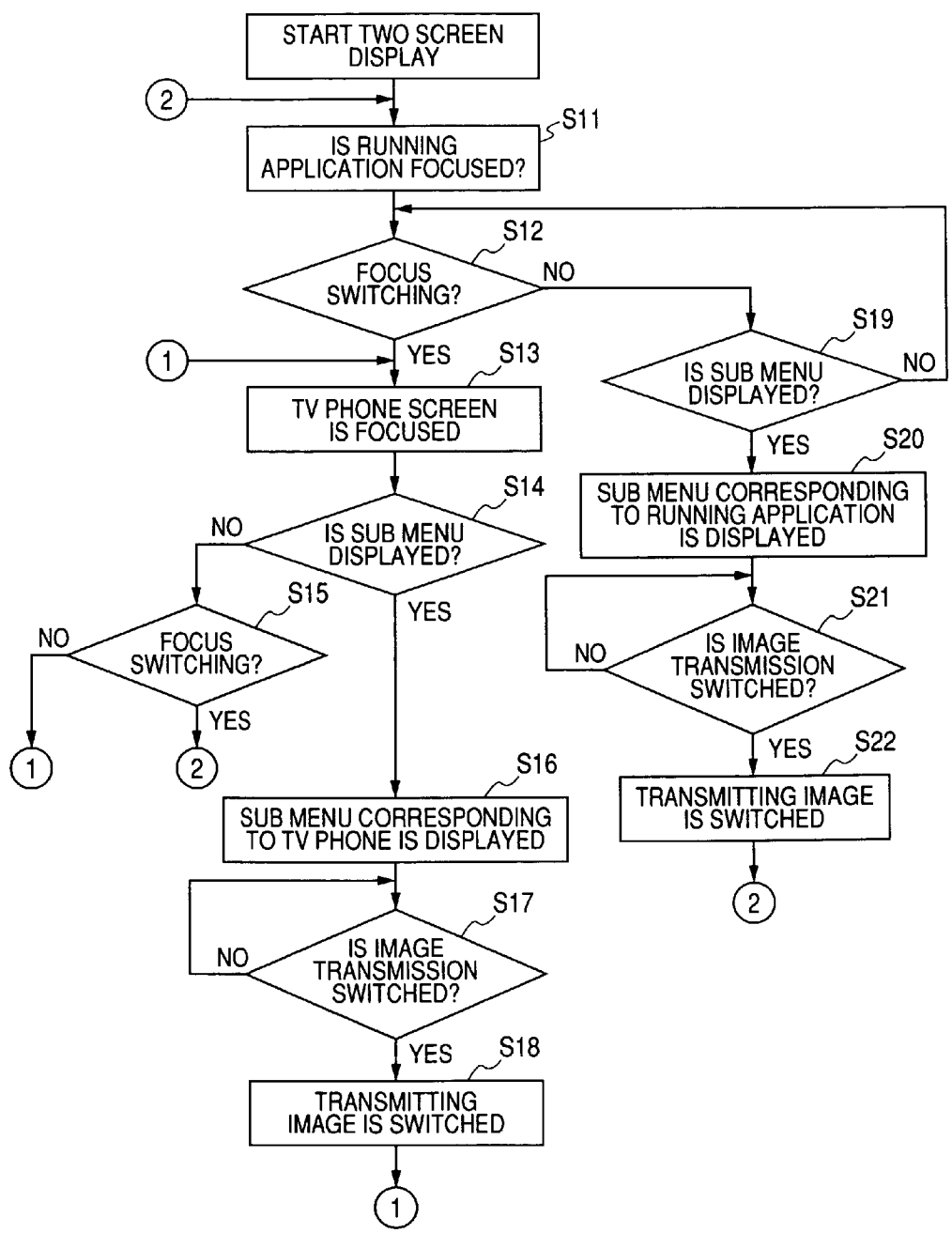
FIG. 6 is an exemplary flow chart showing an operation control when a display screen by the running application and a display screen by a videophone are simultaneously displayed on two screens.

[FIG. 6]
　a: START TWO SCREEN DISPLAY
　S11: IS RUNNING APPLICATION FOCUSED?
　S12: FOCUS SWITCHING?
　S13: TV PHONE SCREEN IS FOCUSED
　S14: IS SUB MENU DISPLAYED
　S15: FOCUS SWITCHING?
　S16: SUB MENU CORRESPONDING TO TV PHONE IS DISPLAYED
　S17: IS IMAGE TRANSMISSION SWITCHED
　S18: TRANSMITTING IMAGE IS SWITCHED
　S19: IS SUB MENU DISPLAYED?
　S20: SUB MENU CORRESPONDING TO RUNNING APPLICATION IS DISPLAYED
　S21: IS IMAGE TRANSMISSION SWITCHED
　S22: TRANSMITTING IMAGE IS SWITCHED

[FIG. 7]
　a: STATE A
　56: MAIL
　58: BROWSER
　b: INPUT PHONE NUMBER
　c: STATE B
　d: TV PHONE
　e: CALL
　f: TV PHONE
　g: TO CALL
　h: STATE C
　i: MENU
　j: BACK
　k: STATE D
　l: BROWSER STARTS
　m: SELECT
　n: BROWSER
　o: STATE F
　p: STATE E
　q: DOUBLE CLICK DOWN KEY
　r: FOCUS SWITCHING
　s: DOUBLE CLICK UP KEY
　t: MENU
　v: STATE E'
　w: STATE F'
　x: selection

[FIG. 8]
　a: STATE E'
　b: SELECT 'SCREEN TRANSMISSION SWITCHING'
　c: STATE G
　d: FOCUSED
　e: REDUCED BROWSER SCREEN IS DISPLAYED (TRANSMITTING IMAGE)
　f: FOCUS SWITCHING
　g: STATE F'
　h: SELECT 'SCREEN TRANSMISSION SWITCHING'
　i: Switch Focus

[FIG. 10]
　a: STATE F
　b: TV PHONE
　c: BROWSER STARTS
　d: BROWSER (WAP)
　e: MENU
　f: SELECT
　g: FOCUS SWITCHING
　h: STATE C
　i: TV PHONE
　j: MENU
　k: BROWSER

13

[FIG. 11]
 a: STATE E
 b: TV PHONE
 c: KEY INPUT
 d: DOUBLE CLICK OR TRIPLE CLICK DOWN KEY
 e: DOUBLE CLICK OR TRIPLE CLICK UP KEY
 f: BROWER (WAP)
 g: MENU
 h: HANDS-FREE SWITCHING
 i: FOCUS SWITCHING
 j: TO BROWSER APPLICATION
 k: KEY INPUT
 l: STATE F
 m: MENU
 n: SELECT
 o: FOCUS SWITCHING

[FIG. 12]
 a: SCREEN OF TERMINAL
 b: STATE F
 c: TV PHONE
 d: THE INTENDED PARTY
 e: THE USER
 f: BROWSER (WAP)
 g: MENU
 h: SELECT
 i: FOCUS SWITCHING
 j: IMAGE TRANSMITTING
 l: COMMUNICATING
 m: THE INTENDED PARTY
 n: THE USER
 o: SOFT KEY
 p: SOFT KEY
 q: SUB MENU
 r: STATE H
 s: TRANSMITTING IMAGE
 t: TERMINAL OF INTENTED PARTY

Figure 13:
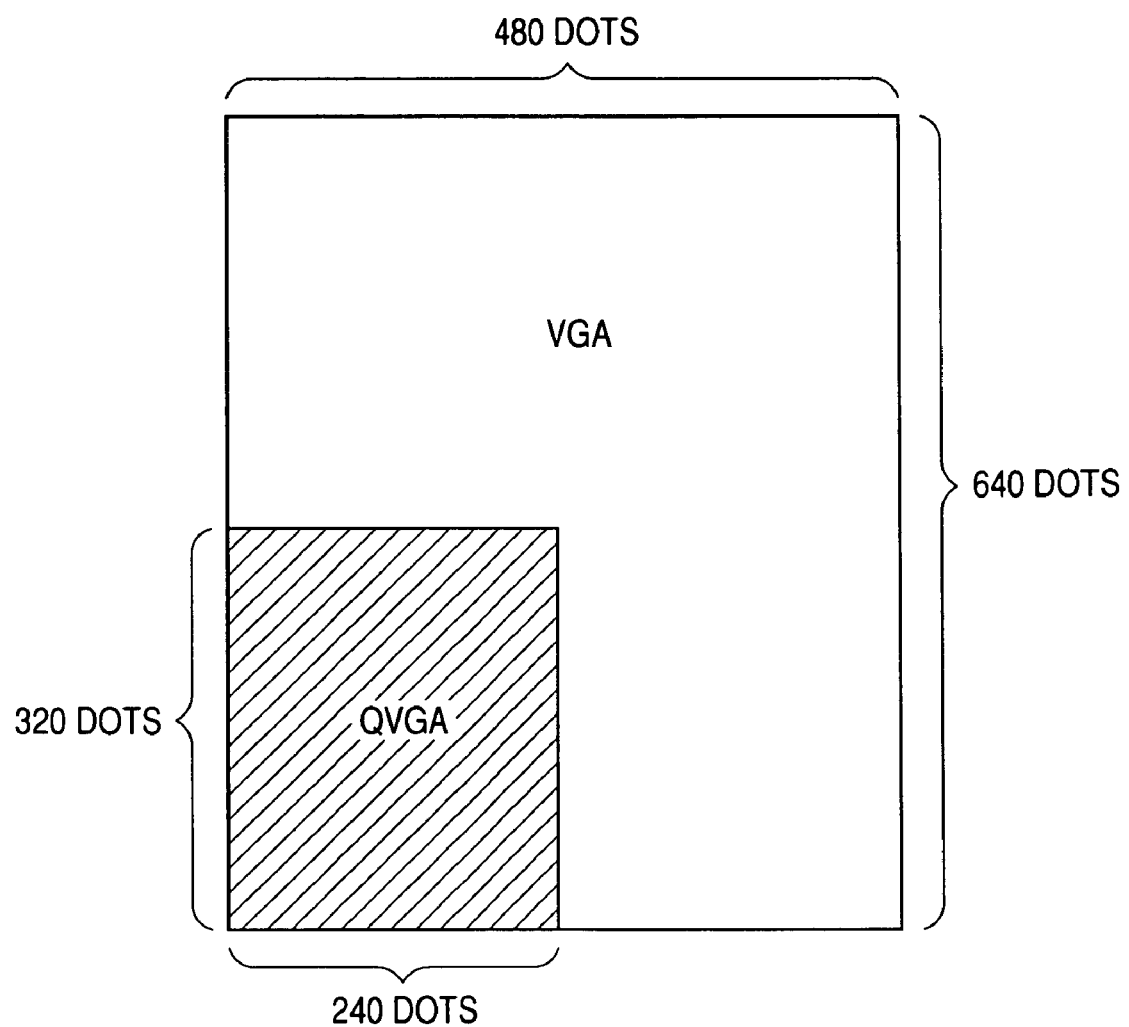
FIG. 13 is an exemplary view comparing QVGA whose pixel numbers are 320×240 dots with VGA whose pixel numbers are 640×480 dots.

[FIG. 13]
 a: 480 DOTS
 b: 320 DOTS
 c: 240 DOTS
 d: 640 DOTS

What is claimed is:

1. A portable terminal device for communicating with another terminal device, comprising:
 a display configured to display an image data;
 a transmitting unit configured to transmit the image data to the other terminal device;
 a receiving unit configured to receive a reception image data from the other terminal device;
 a display control unit configured to simultaneously display on the display an application image data to be displayed by a predetermined application program and at least one of the image data and the reception image data displayed by a videophone function;
 a selecting unit configured to allow a user to select either one of the image data and the application image data simultaneously displayed on the display; and
 a transmission control unit configured to allow the transmitting unit to transmit the image data or the application image data selected by the selecting unit to the other terminal device,
 wherein when the application image data is transmitted to the other terminal device, the display control unit causes a reduced image of the application image data being transmitted to be displayed in a display area of the videophone function.

14

2. The portable terminal device according to claim 1, wherein, when the selecting unit is at least partly pressed continuously or for a predetermined time, the image data or the displayed application image data is selected as an operating object.

3. The portable terminal device according to claim 2, wherein, when the selecting unit is at least partly pressed continuously or for a predetermined time, the displayed application image data is in an active state as an operating objection.

4. The portable terminal device according to claim 3, further comprising:
 a menu screen display unit configured to display a menu screen comprising a plurality of items on the display, wherein the menu screen can switch the plurality of items in accordance with the active state of the displayed application image data.

5. The portable terminal device according to claim 1, further comprising:
 a menu screen display unit configured to display a menu screen comprising a plurality of items on the display, wherein an item for transmitting to the other terminal the application image data, which is currently displayed on the display, is selected among the plurality of items, and wherein the transmission control unit transmits, to the other terminal device, the application image data which is currently displayed on the display.

6. The portable terminal device according to claim 5, wherein, when the selecting unit is at least partly pressed continuously or for a predetermined time, the image data or the displayed application image data is selected as an operating object.

7. The portable terminal device according to claim 6, wherein, when the selecting unit is at least partly pressed continuously or for a predetermined time, the displayed application image data is in an active state as the operating objection.

8. The portable terminal device according to claim 7, wherein the menu screen can switch the plurality of items in accordance with the active state of the displayed application image data.

9. The portable terminal device according to claim 1, wherein the application image data is compressed according to a-predetermined image codec that is used to compress the image data by a videophone function, and
 wherein the compressed application image is transmitted to the other terminal device.

10. A portable terminal device for communicating with another terminal device, comprising:
 a display configured to display an image data;
 a transmitting unit configured to transmit the image data to the other terminal device;
 a receiving unit configured to receive a reception image data from the other terminal device;
 a display control unit configured to simultaneously display an application image data to be displayed by a predetermined application program on the display together with a videophone image, if a predetermined operation for executing the predetermined application program is performed during activation of a videophone function; and
 a transmission control unit configured to transmit the application image data, instead of the image data that is transmitted by the transmitting unit, to the other terminal device, in response to the predetermined operation,
 wherein the display control unit causes a reduced image of the application image data being transmitted by the transmission control unit to be displayed in a display area of the videophone image.

11. A portable terminal device for communicating other terminal device, comprising:
- a camera configured to capture a video data;
- a key unit including at least a soft key;
- a display configured to display a pictograph, the pictograph being capable of including explanation regarding a function associated with operation of the soft key;
- a transmitting unit configured to transmit the video data to the other terminal device;
- a receiving unit configured to receive a reception image data from the other terminal device;
- a display control unit configured to allow an application image data to be displayed by a predetermined application program to be displayed on the display and either one of the image data and the reception image data, after the soft key is operated while the transmitting unit transmitting the video data;
- a selecting unit configured to select either one of the video data and the application image data displayed on the display; and
- a transmission control unit configured to allow the transmitting unit to transmit the video data or the application image data selected by the selecting unit to the other terminal device.

* * * * *